US012675504B2

(12) United States Patent
Taminato

(10) Patent No.: US 12,675,504 B2
(45) Date of Patent: Jul. 7, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomoki Taminato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/800,920

(22) Filed: Aug. 12, 2024

(65) Prior Publication Data

US 2025/0061135 A1      Feb. 20, 2025

(30) Foreign Application Priority Data

Aug. 14, 2023    (JP) ................................. 2023-132122

(51) Int. Cl.
    *G06F 16/00*          (2019.01)
    *G06F 16/28*          (2019.01)
(52) U.S. Cl.
    CPC .................................. *G06F 16/285* (2019.01)
(58) Field of Classification Search
    CPC .. G06F 16/9535; G06F 18/21; G06F 18/2113;
            G06F 18/23213; G06F 18/241; G06F
            18/251; G06F 18/22; G06F 40/284; G06F
            16/29; G06F 18/213; G06F 18/23; G06F
            30/13; G06F 30/27; G06F 40/30; G06F
            16/31; G06F 18/214; G06F 18/2415;
            G06F 16/14; G06F 16/55; G06N 20/00;
            G06N 20/20; G06N 5/022; G06N 3/045;
            G06N 3/09; G06N 3/08; G06N 3/084;

G06N 3/044; G06N 3/0442; G06N 5/01;
    G06N 20/10; G06N 7/01; G06N 5/02;
    G06N 3/047; G06N 3/082; G06N 3/094;

(Continued)

(56) References Cited

U.S. PATENT DOCUMENTS 12,314,385 B1 *   5/2025   Beauchesne ............ G06F 21/52
2016/0255139 A1 *   9/2016   Rathod ................. H04L 51/046
                                                                      709/203

(Continued)

FOREIGN PATENT DOCUMENTS

JP          2020512631 A         4/2020
JP          2021081793 A         5/2021
KR          20230062052 A        5/2023

*Primary Examiner* — Shyue Jiunn Hwa
(74) *Attorney, Agent, or Firm* — Canon U.S.A., Inc. IP Division

(57)          ABSTRACT

Analysis of data for each category is performed with high accuracy. An information processing apparatus includes one or more memories storing instructions and one or more processors that are in communication with the one or more memories. When executing the instructions, the one or more processors cooperate with the one or more memories to perform operations that comprise identifying a category of input data using a category identification model, and selecting, based on goodness-of-fit values of data belonging to an N-th category with respect to analysis models for first to M-th categories for analysis of data in the first to M-th categories, an analysis model to be applied to the input data identified by the identifying as being in the N-th category from the analysis models for the first to M-th categories.

12 Claims, 8 Drawing Sheets

(58) Field of Classification Search
CPC .... G06N 5/04; G06Q 10/063; G06Q 10/0635;
G06Q 10/067; H04L 12/1827; H04L
51/046; H04L 67/01; G06V 10/764;
G06V 10/82; G06V 20/68
See application file for complete search history.

(56)                References Cited

U.S. PATENT DOCUMENTS

| | | |
|---|---|---|
| 2018/0268258 A1 | 9/2018 | Tapia et al. |
| 2022/0269996 A1 | 8/2022 | Nogami |
| 2023/0307131 A1* | 9/2023 | Breiter .................. G16H 10/20 |
| 2024/0062101 A1* | 2/2024 | O'Hara ................. G06N 20/20 |
| 2024/0221407 A1* | 7/2024 | Hu ........................... G06N 3/08 |

\* cited by examiner

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

In recent years, a technique of extracting useful information from various kinds of data such as images, texts, and time-series data and analyzing the information has been discussed. Particularly, with use of a machine learning technique, it becomes possible to analyze information with high accuracy. Japanese Unexamined Patent Application Publication No. 2020-512631 describes a system of identifying to which category unknown data belongs using a machine learning model, and executing an analysis task appropriate for data in the identified category (hereinafter referred to as a specific category).

As described in Japanese Unexamined Patent Application Publication No. 2020-512631, in a case where the analysis task appropriate for each specific category is executed, it is necessary to prepare an analysis model for each specific category to execute the analysis task. At this time, to increase a type of a specific category, a new analysis model is required. For example, however, there is a case where generation of the new analysis model is difficult due to limitations of hardware resources.

SUMMARY

Embodiments of the present disclosure are directed to analysis of data for each category with high accuracy.

According to an aspect of the present disclosure, an information processing apparatus includes one or more memories storing instructions and one or more processors that are in communication with the one or more memories. When executing the instructions, the one or more processors cooperate with the one or more memories to perform operations that comprise identifying a category of input data, and selecting, based on a goodness-of-fit value of data belonging to a first category with respect to each of analysis models for respective categories for analysis of data in the respective categories, an analysis model to be applied to the input data identified as being in the first category by the identifying from the analysis models for the respective categories.

Further features of various embodiments will become apparent from the following description of exemplary embodiments with reference to the attached drawings.

DESCRIPTION OF THE EMBODIMENTS

Exemplary embodiments will be described below with reference to the accompanying drawings.

In a first exemplary embodiment, a description will be given of a system of identifying, with respect to an input image, a category of an object in the image, applying a detection model for detecting a specific part (for example, the face) in the identified category, and detecting the specific part from the image. Processing of detecting the specific part in the category from the image is an example of analysis processing. The input data may be not only an image, but also texts, time-series data, or the like, and is not specifically limited.

Figure 1:
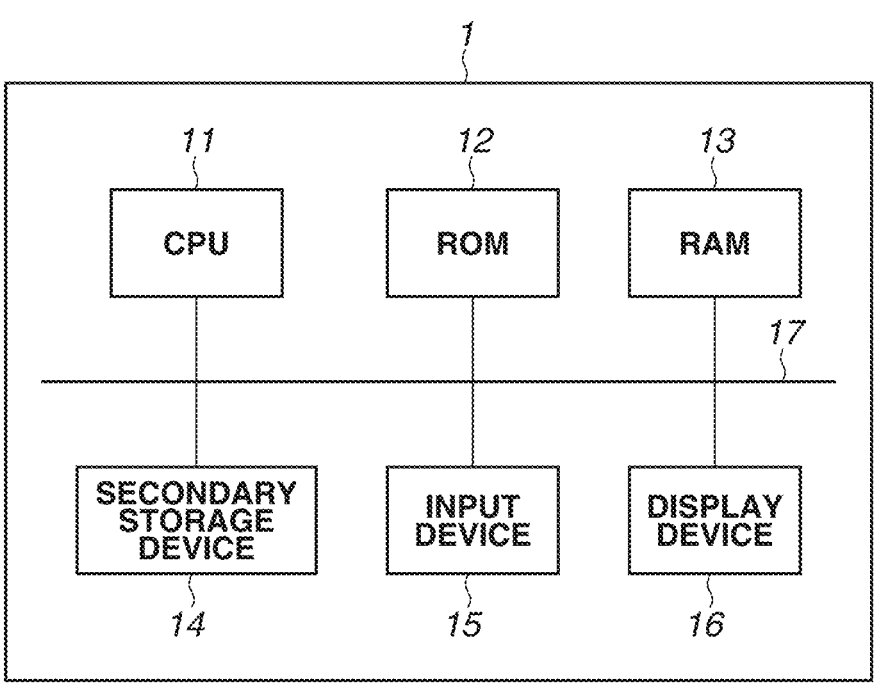
FIG. 1 is a diagram illustrating a hardware configuration example of an information processing apparatus.

FIG. 1 illustrates a hardware configuration example of an information processing apparatus according to the present exemplary embodiment. An information processing apparatus 1 is configured to include a central processing unit (CPU) 11, a read-only memory (ROM) 12, a random-access memory (RAM) 13, a secondary storage device 14, an input device 15, and a display device 16. These constituent units are connected to each other via a connection bus 17. The CPU 11 controls the whole of the information processing apparatus 1. The CPU 11 executes a control program stored in the ROM 12 or the like to execute processing in each flowchart, which will be described below. A graphics processing unit (GPU) may be used instead of the CPU, or with the CPU.

The ROM 12 is a non-volatile memory, and stores a control program and various kinds of parameter data. The RAM 13 is a volatile memory, and temporarily stores images, a control program, and a result of execution of the control program. The secondary storage device 14 is a rewritable secondary storage device such as a hard disk or a flash memory, and stores various kind of data used for each flowchart, which will be described below. For example, the secondary storage device 14 stores input data, datasets for training, and processing results. These pieces of information are output to the RAM 13 and used by the CPU 11 to execute the control program. The input device 15 is a keyboard, a mouse, a touch panel device, or the like, and takes input of various kinds of instructions from a user.

The display device 16 is a monitor, and displays a processing result, an image, or the like.

In the present exemplary embodiment, processing, which will be described below, is implemented by software using the CPU 11, but part or all of the processing, which will be described below, may be implemented by hardware. As the hardware, a dedicated circuit (an application-specific integrated circuit (ASIC)), a processor (a reconfigurable processor or a digital signal processor (DSP)), or the like can be used. Additionally, the information processing apparatus 1 includes a communication unit for communicating with an external apparatus, and may acquire input data, a control program, datasets for training, or the like from the external apparatus via the communication unit, and output a processing result or the like to the external apparatus via the communication unit.

Figure 2:
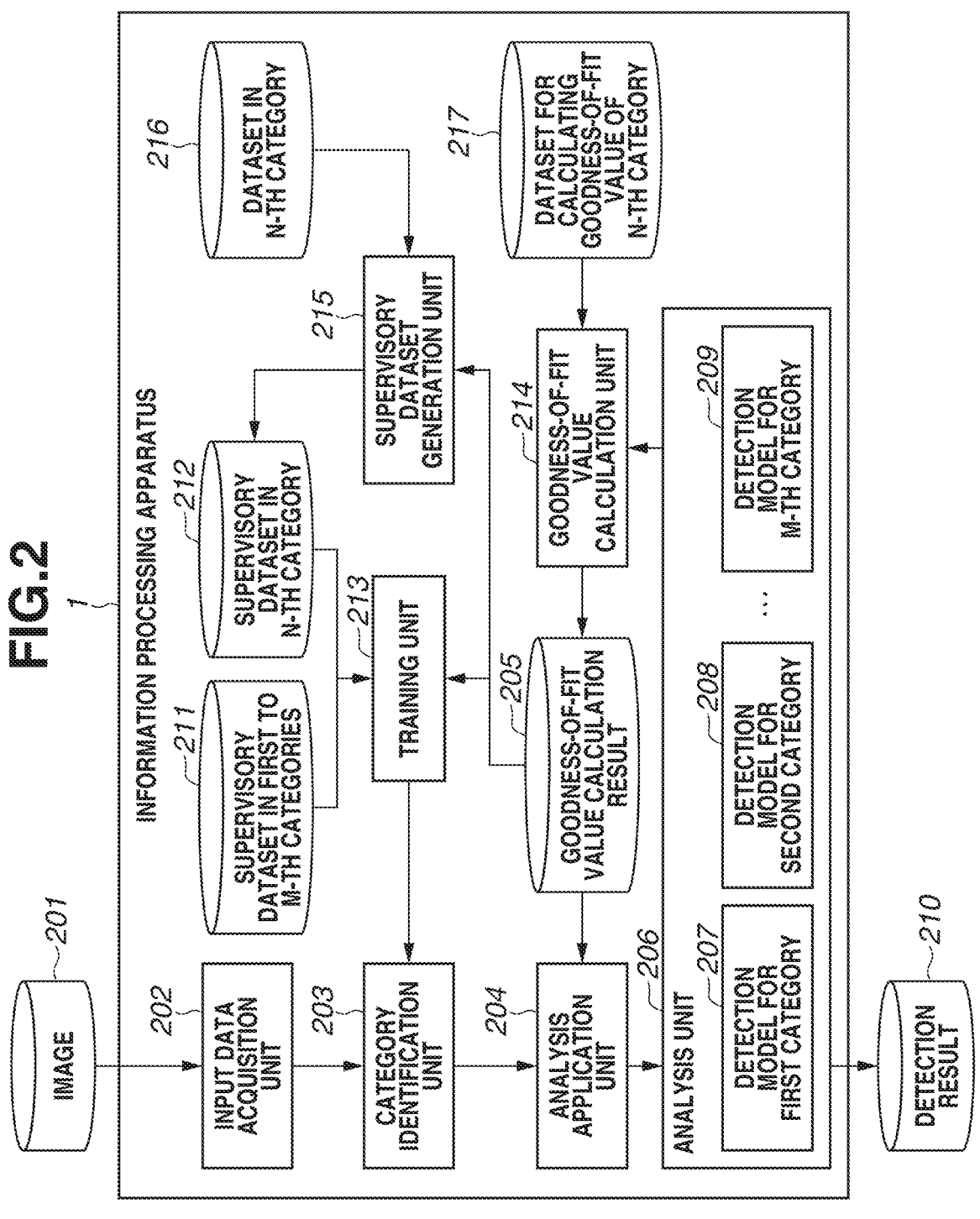
FIG. 2 is a diagram illustrating a functional configuration example of the information processing apparatus.

FIG. 2 is a diagram illustrating a functional configuration example of the information processing apparatus 1 according to the present exemplary embodiment. The information processing apparatus 1 is configured to implement functions of functional units illustrated in FIG. 2 by the CPU 11 executing the control program stored in the ROM 12 or the like. The information processing apparatus 1 includes an input data acquisition unit 202, a category identification unit 203, and an analysis unit 206.

The input data acquisition unit 202 acquires an image 201, as the input data, from the external apparatus or the secondary storage device 14.

The category identification unit 203 identifies a category of an image. In the present exemplary embodiment, sequential numbers from the first to the N-th are allocated to categories, and N categories (the first category, the second category, . . . the M-th category, and the N-th category (N>M)) are identified. The category identification unit 203 includes a category identification model for identifying a category of an object in an image.

The analysis unit 206 includes a detection model that detects a region of a specific part (hereinafter referred to as a specific region) in a category from an image. In the present exemplary embodiment, the analysis unit 206 includes M detection models for respective M categories (a detection model 207 for the first category, a detection model 208 for the second category, . . . , a detection model 209 for the M-th category). Meanwhile, the analysis unit 206 does not include a detection model for the N-th category (N>M).

Each detection model is a machine learning model that has been trained with a supervisory dataset belonging to each category. The detection model 207 for the first category is a machine learning model that has been trained with a supervisory dataset belonging to the first category. Similarly, the detection models for the second to the M-th categories are machine learning models that have been trained with supervisory datasets belonging to the respective categories. Each machine learning model is, for example, a model that has been trained with a multi-layered neural network based on ground truth information regarding a specific region in a category. As a training method, a known method, such as "RetinaFace: Single-stage Dense Face Localisation in the Wild", CVPR 2020, written by Jiankang Deng, Jia Guo, Evangelos Ververas, Irene Kotsia, and Stefanos Zafeiriou, is adopted.

<Processing of Calculating Goodness-of-Fit Value of N-Th Category>

The information processing apparatus 1 includes a goodness-of-fit value calculation unit 214. Processing executed by the goodness-of-fit value calculation unit 214 is described below. In the present exemplary embodiment, the goodness-of-fit value calculation unit 214 uses the detection models for the first to M-th categories included in the analysis unit 206 and a dataset 217 for calculating a goodness-of-fit value of the N-th category to generate a goodness-of-fit value calculation result 205. The generated goodness-of-fit value calculation result 205 is stored in the secondary storage device 14 or the like.

Figure 3:
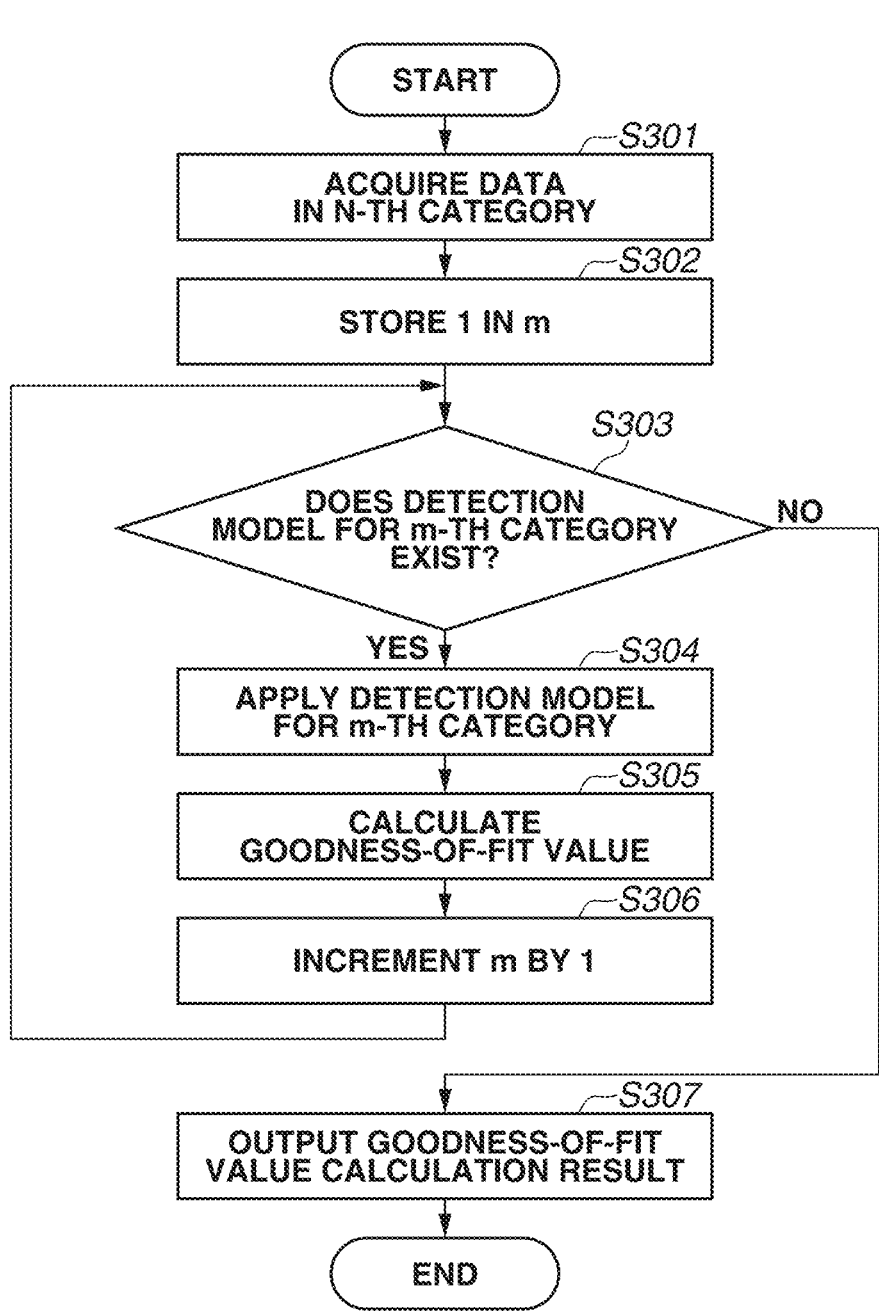
FIG. 3 is a flowchart describing processing of calculating a goodness-of-fit value of an N-th category.

FIG. 3 is a flowchart describing processing of calculating the goodness-of-fit value of the N-th category. The goodness-of-fit value of the N-th category data with respect to a detection model for an m-th category is an index indicating whether the detection model for the m-th category is applicable to detection of the specific region in the N-th category. The goodness-of-fit value of the N-th category data with respect to the detection model for the m-th category is represented by a goodness-of-fit value A (N:m).

In the following description, each step is denoted by prepending S to a step number, and a notation of "step" is omitted.

In S301, the goodness-of-fit value calculation unit 214 acquires the dataset 217 for calculating the goodness-of-fit value of the N-th category. The dataset 217 for calculating the goodness-of-fit value of the N-th category includes one or more pairs of data composed of an image in which an object in the N-th category is captured and information indicating the specific region in the image (ground truth information). The dataset 217 for calculating the goodness-of-fit value of the N-th category may be stored in the secondary storage device 14 or the like. The goodness-of-fit value calculation unit 214 may acquire the dataset 217 for calculating the goodness-of-fit value of the N-th category from the secondary storage device 14 or the external apparatus.

In S302, the goodness-of-fit value calculation unit 214 stores 1 in m indicating a category number.

In S303, the goodness-of-fit value calculation unit 214 determines whether the detection model for the m-th category exists in the analysis unit 206. In a case of determining that the detection model for the m-th category exits (YES in S303), the goodness-of-fit value calculation unit 214 acquires the detection model for the m-th category from the analysis unit 206, and the processing proceeds to S304. In a case where the goodness-of-fit value calculation unit 214 determines that the detection model for the m-th category does not exit (NO in S303), the processing proceeds to S307.

In S304, the goodness-of-fit value calculation unit 214 applies the detection model for the m-th category to the dataset 217 for calculating the goodness-of-fit value of the N-th category acquired in S301. Specifically, the goodness-of-fit value calculation unit 214 inputs an image in the dataset 217 for calculating the goodness-of-fit value of the N-th category to the detection model for the m-th category and detects a region from the image.

In S305, the goodness-of-fit value calculation unit 214 calculates the goodness-of-fit value A (N:m) based on a comparison result between the detected region detected with the detection model for the m-th category in S304 and the specific region indicated by the ground truth information in the dataset 217 for calculating the goodness-of-fit value of the N-th category. In this processing, the goodness-of-fit value calculation unit 214 acquires a difference between the regions as a comparison result. Assume that the difference between the regions is quantitatively given by, for example, a difference in position between the regions, a difference in size or area, or a combination thereof. In a case where the difference between the regions is large, the specific region in the N-th category cannot be detected with the detection model for the m-th category. Thus, it is possible to determine that the goodness-of-fit value A (N:m) is low. On the other hand, in a case where the difference between the regions is small, the specific region in the N-th category can be detected with the detection model for the m-th category. Thus, it is possible to determine that the goodness-of-fit value A (N:m) is high. The goodness-of-fit value A (N:m) may be represented by a reciprocal number of the difference between the detection region detected with the detection model for the m-th category and the specific region in the N-th category, and may be represented by a size of Intersection over Union (IoU) between the detection region and the specific region, or the like.

In S306, the goodness-of-fit value calculation unit 214 increments m indicating the category number by 1, and the processing proceeds to S303.

The goodness-of-fit value calculation unit 214 repeats the processing in S303 to S306, and thereby calculates the goodness-of-fit value A (N:m) of each of the M detection models from the detection model 207 for the first category to the detection model 209 for the M-th category.

Finally, in S307, the goodness-of-fit value calculation unit 214 stores M goodness-of-fit values A (N:m) (m=1, 2, . . . , M), as the goodness-of-fit value calculation result 205, in the secondary storage device 14 or the like. Thereafter, a series of processing in the flowchart ends.

<Training Processing on Category Identification Model>

The information processing apparatus 1 includes a supervisory dataset generation unit 215 and a training unit 213. Processing executed by the supervisory dataset generation unit 215 and the training unit 213 is described below. The training unit 213 trains the category identification model to be used in the category identification unit 203. The supervisory dataset for training the category identification model is composed of a supervisory dataset 211 in the first to M-th categories and a supervisory dataset 212 in the N-th category. The supervisory dataset 211 is stored in the secondary storage device 14 or the like. The supervisory dataset 212 is generated by the supervisory dataset generation unit 215. The supervisory datasets 211 and 212 include a plurality of datasets each composed of a pair of an image in which an object is captured and label information indicating to which category the object in the image belongs.

In the present exemplary embodiment, a description is given of a case where only the goodness-of-fit value A (N:1) is high among the M goodness-of-fit values A (N:m). In this case, the supervisory dataset 212 in the N-th category may be labeled with a subcategory of the first category, and used for training the category identification model. Also, the supervisory dataset 212 in the N-th category may be labeled with the N-th category as an M+1-th category, and used for training the category identification model. In the former case, the training unit 213 performs training so as to identify the M categories from the first to M-th categories. In the latter case, the training unit 213 performs training so as to identify (M+1) categories obtained by addition of the N-th category.

Processing executed by the supervisory dataset generation unit 215 in the above-mentioned former case is described below. In the present exemplary embodiment, the supervisory dataset generation unit 215 generates, based on the goodness-of-fit value calculation result 205, the supervisory dataset 212 in the N-th category from a dataset 216 in the N-th category.

Figure 4:
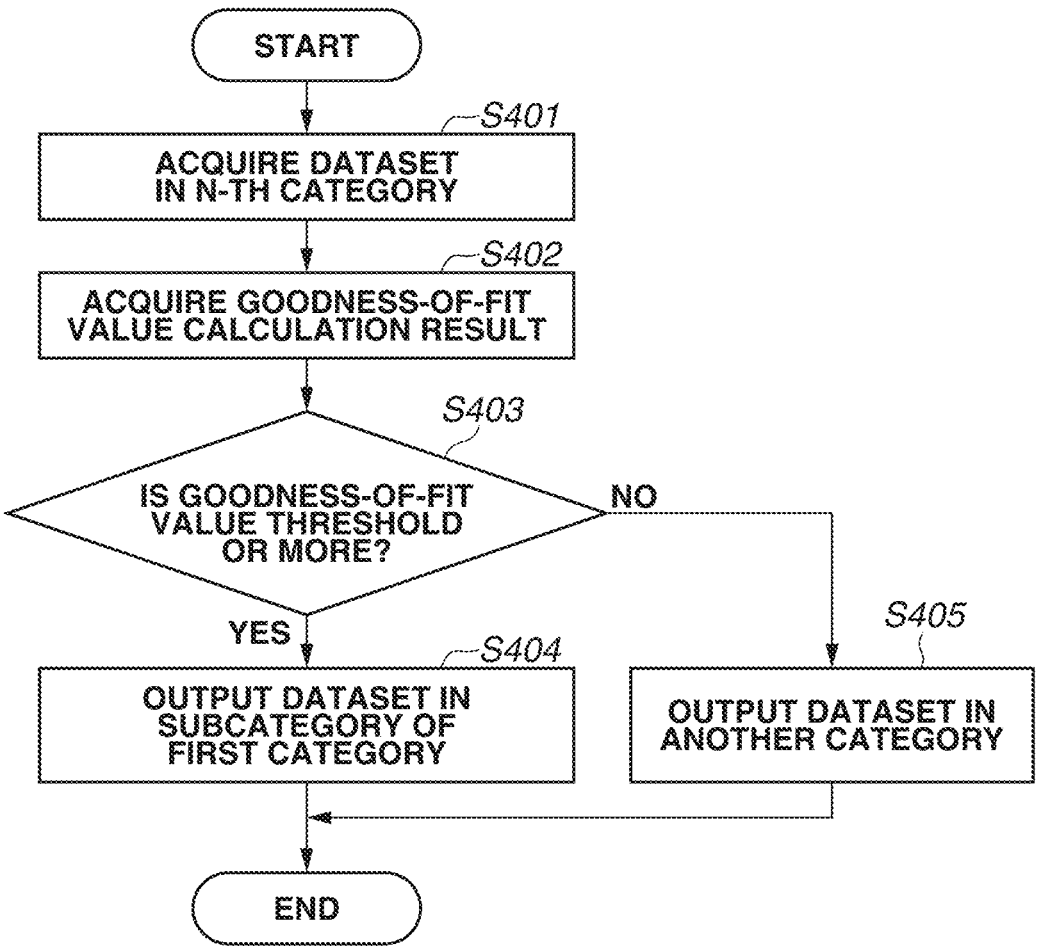
FIG. 4 is a flowchart describing processing of generating supervisory data in the N-th category.

FIG. 4 is a flowchart describing processing of generating supervisory data in the N-th category.

In S401, the supervisory dataset generation unit 215 acquires the dataset 216 in the N-th category. The dataset 216 in the N-th category may be stored in the secondary storage device 14 or the like. The supervisory dataset generation unit 215 may acquire the dataset 216 in the N-th category from the secondary storage device 14 or the external apparatus.

In S402, the supervisory dataset generation unit 215 acquires the goodness-of-fit value A (N:m) of data in the N-th category with respect to the detection model for the m-th category from the goodness-of-fit value calculation result 205.

As described above, a description is given of a case where only the goodness-of-fit value A (N:1) is acquired in S402 assuming that only the goodness-of-fit value A (N:1) is high among the M goodness-of-fit values A (N:m).

In S403, the supervisory dataset generation unit 215 determines whether the goodness-of-fit value A (N:1) is a predetermined threshold or more. In a case where the supervisory dataset generation unit 215 determines that the goodness-of-fit value A (N:1) is the threshold or more (YES in S403), the processing proceeds to S404. In a case where the supervisory dataset generation unit 215 determines that the goodness-of-fit value A (N:1) is less than the threshold (NO in S403), the processing proceeds to S405.

In S404, the supervisory dataset generation unit 215 labels the dataset 216 in the N-th category with the subcategory of the first category, and generates a dataset as the supervisory dataset 212 in the N-th category. With this processing, it becomes possible to proceed with training on the category identification model so as to approximate the N-th category to the first category. The generated supervisory dataset 212 is stored in the secondary storage device 14 or the like. Thereafter, the processing in this flowchart ends.

In S405, the supervisory dataset generation unit 215 labels the dataset 216 in the N-th category with a category different from the first category and generates a dataset as the supervisory dataset 212 in the N-th category. With this processing, it becomes possible to proceed with training on the category identification model so as to make the N-th category away from the first category. The generated supervisory dataset 212 is stored in the secondary storage device 14 or the like. Thereafter, the processing in this flowchart ends.

Figure 5:
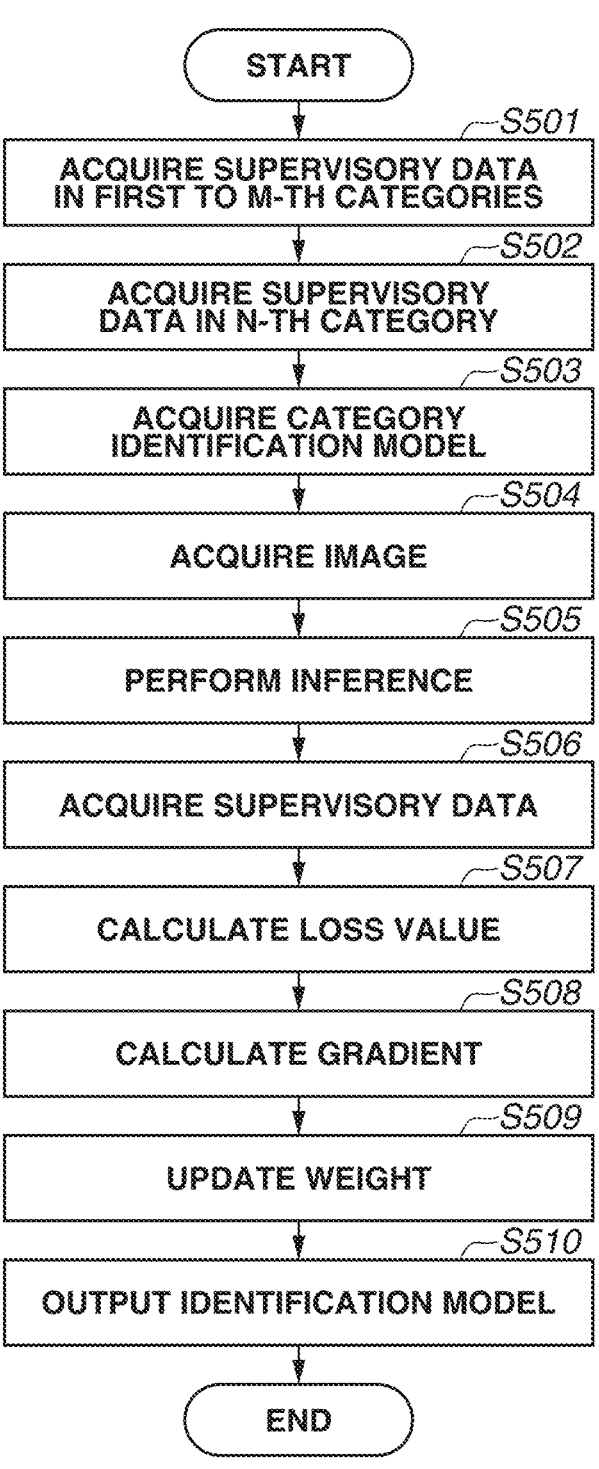
FIG. 5 is a flowchart describing training processing on a category identification model.

FIG. 5 is a flowchart describing training processing on the category identification model. The training unit 213 uses the supervisory dataset 211 in the first to M-th categories, which has been prepared in advance, and the supervisory dataset 212 in the N-th category, which has been generated by the supervisory dataset generation unit 215, to train the category identification model.

In S501, the training unit 213 acquires the supervisory dataset 211 in the first to M-th categories.

In S502, the training unit 213 acquires the supervisory dataset 212 in the N-th category.

In S503, the training unit 213 acquires the category identification model to be used in the category identification unit 203. In the present exemplary embodiment, the category identification model is a machine learning model for identifying a category of an object in an image. Assume that the machine learning model is a multi-layered neural network. However, the machine learning model is not limited to the multi-layered neural network, and a known machine learning model, such as Random Forest and AdaBoost, may be used.

In S504, the training unit 213 acquires a mini batch image as an input image from the supervisory dataset acquired in S501 and S502.

In S505, the training unit 213 uses the category identification model acquired in S503 to perform inference processing on the image acquired in S504.

In S506, the training unit 213 acquires label information corresponding to the image acquired in S504.

In S507, the training unit 213 calculates a loss value (loss function).

In S508, the training unit 213 calculates a gradient by applying a backpropagation method to the loss value calculated in S507 and obtains an updating amount of a weight of the category identification model.

In S509, the training unit 213 updates the weight of the category identification model. Specifically, a known learning method for the multi-layered neural network is only required to be applied, and a detailed description is omitted.

In S510, the training unit 213 outputs the category identification model whose weight has been updated to the category identification unit 203.

The training unit 213 repeatedly executes the processing in S501 to S510 until the loss value or accuracy of identification converges, and thereby determines the weight of the category identification model. Thereafter, a series of processing in the flowchart ends.

<Processing of Applying Detection Model>

Figure 6:
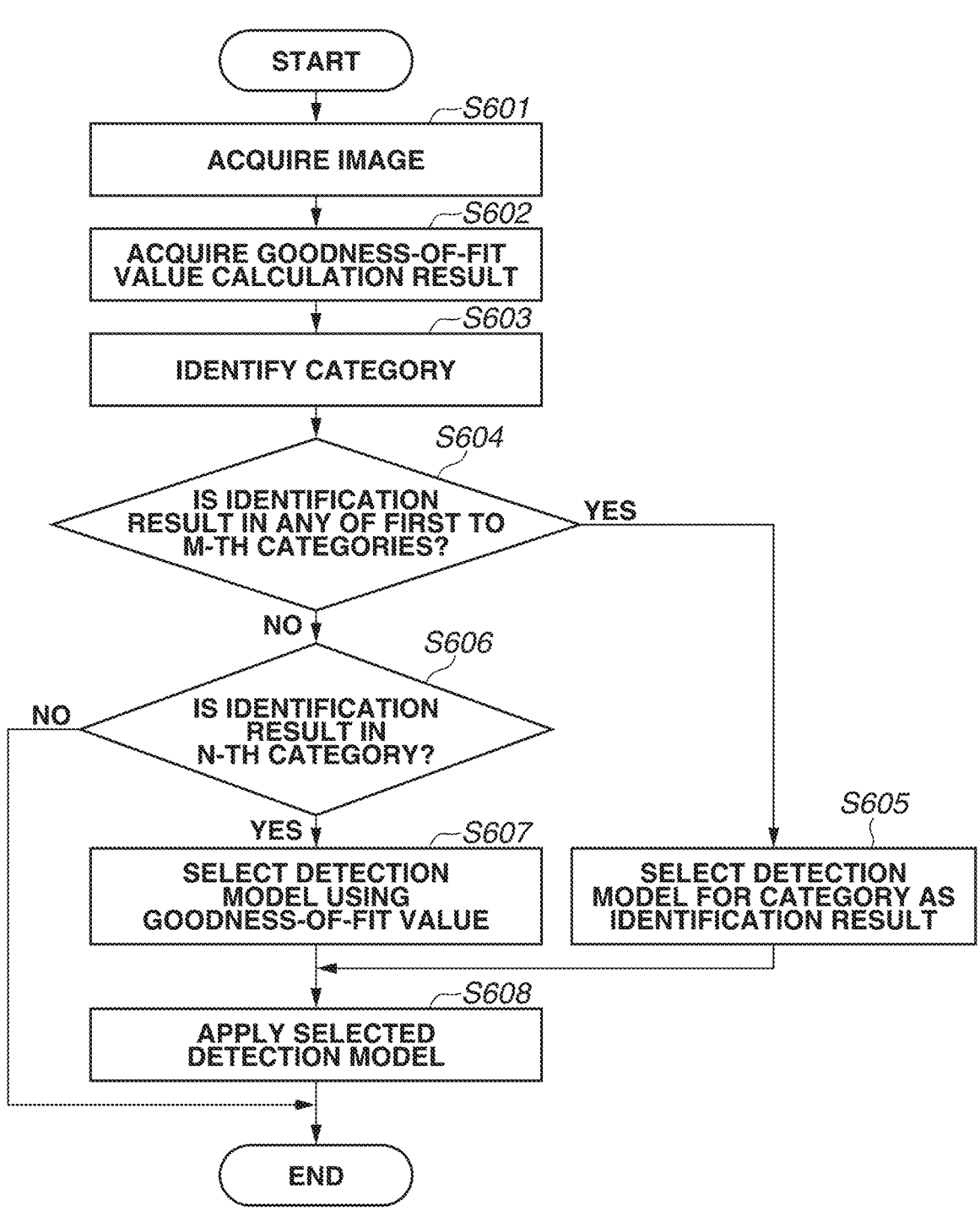
FIG. 6 is a flowchart describing processing of applying a detection model.

FIG. 6 is a flowchart describing processing of applying a detection model. The processing of applying a detection model is processing of identifying a category of input data in an unknown category, selecting a detection model corresponding to the identified category, and applying the detection model to the input data. The information processing apparatus 1 includes an analysis application unit 704. Processing executed by the analysis application unit 704 is described below with reference the flowchart in FIG. 6. Assume that the category identification unit 203 includes a category identification model capable of identifying the first to N-th categories. Additionally, assume that the analysis unit 206 includes detection models for the first to M-th categories. Furthermore, assume that the goodness-of-fit value calculation result 205 includes M goodness-of-fit values A (N:m) (m=1, 2, . . . , M) of data in the N-th category with respect to the respective detection models for the first to M-th categories.

In S601, the input data acquisition unit 202 acquires an image 201 in an unknown category.

In S602, an analysis application unit 204 acquires the goodness-of-fit value calculation result 205.

In S603, the category identification unit 203 uses the category identification model to identify a category of the image 201, and outputs an identification result.

In S604, the analysis application unit 204 determines whether the identification result is in any of the first to M-th categories. In a case where the analysis application unit 204 determines that the identification result is in any of the first to M-th categories (YES in S604), the processing proceeds to S605. In a case where the analysis application unit 204 determines that the identification result is in a category other than the first to M-th categories (NO in S604), the processing proceeds to S606.

In S605, the analysis application unit 204 selects a detection model for the category output as the identification result. Thereafter, the processing proceeds to S608. In this manner, in a case where the identification result indicates any of the first to M-th categories (specific category), the analysis application unit 204 selects the detection model for the corresponding category.

In S606, the analysis application unit 204 determines whether the identification result is in the N-th category. In a case where the analysis application unit 204 determines that the identification result is not in the N-th category (NO in S606), a series of processing in the flowchart ends. In a case where the analysis application unit 204 determines that the identification result is in the N-th category (YES in S606), the processing proceeds to S607.

In S607, the analysis application unit 204 searches for a category n with the highest goodness-of-fit value A (N:n) (1≤n≤M) from the goodness-of-fit calculation result 205 acquired in S602, and selects the detection model for the n-th category. In this manner, in a case where the identification result indicates the N-th category (a category other than the specific category), the analysis application unit 204 selects, based on the goodness-of-fit value with respect to the N-th category, the detection model for the corresponding category from the detection models for the first to M-th categories.

In S608, the analysis unit 206 applies the detection model selected in S605 or S608 to the image 201 acquired in S601, and outputs a detection result 210. Thereafter, the processing in this flowchart ends.

Like in the present exemplary embodiment, in a case where the goodness-of-fit value A (N:1) is high and training is performed on the category identification model by labeling the supervisory dataset 212 in the N-th category with the subcategory of the first category, the training progresses so as to approximate the N-th category to the first category. Hence, the N-th category is identified as the first category in S603 in FIG. 6, and the detection model for the first category is selected in S605.

Meanwhile, in a case where training is performed on the category identification model by labeling the supervisory dataset 212 in the N-th category with the N-th category, the training progresses so as to identify the N-th category as the N-th category. Hence, the N-th category is identified as the N-th category in S603 in FIG. 6, and a detection model is selected from the detection models for the first to M-th categories based on the goodness-of-fit value in S607. In the present exemplary embodiment, since the goodness-of-fit value A (N:1) is high, the detection model for the first category is selected.

In the present exemplary embodiment, even in a case where only the detection model for the specific category exits and an image in a category other than the specific category is acquired, the detection model for the specific category corresponding to the goodness-of-fit value is selected, whereby a high-quality detection task becomes possible. Additionally, by utilizing an image in a category other than the specific category for training on the category identification model as supervisory data for identifying the specific category with a high goodness-of-fit value with respect to the category, it becomes easier to identify an appropriate category to which the detection task is applied. That is, by effectively utilizing the known analysis model, it becomes possible to perform an analysis task with high accuracy also with respect to data in a category other than the specific category.

In the first exemplary embodiment, the description has been given of the configuration of identifying, with respect to the input image, the category of the object in the image, and applying the detection model for detecting the specific part in the identified category. In a second exemplary embodiment, a description will be given of a configuration of classifying an input document into a category such as news (for example, business, science technology, and entertainment), and applying a summarization model that summarizes the document classified into the category. Processing of summarizing the document in the category is an example of analysis processing. Note that a document summarization task is to perform abstractive summarization. Since the abstractive summarization is a task that involves generation of a document, high-quality summarization is supposed to be difficult in comparison with extractive summarization. As a method of improving quality, it is conceivable to use a machine learning model that has been subjected to training dedicated to a category. In the following description, matters in common with the first exemplary embodiment are not described and matters different from the above-mentioned exemplary embodiment are mainly described.

Figure 7:
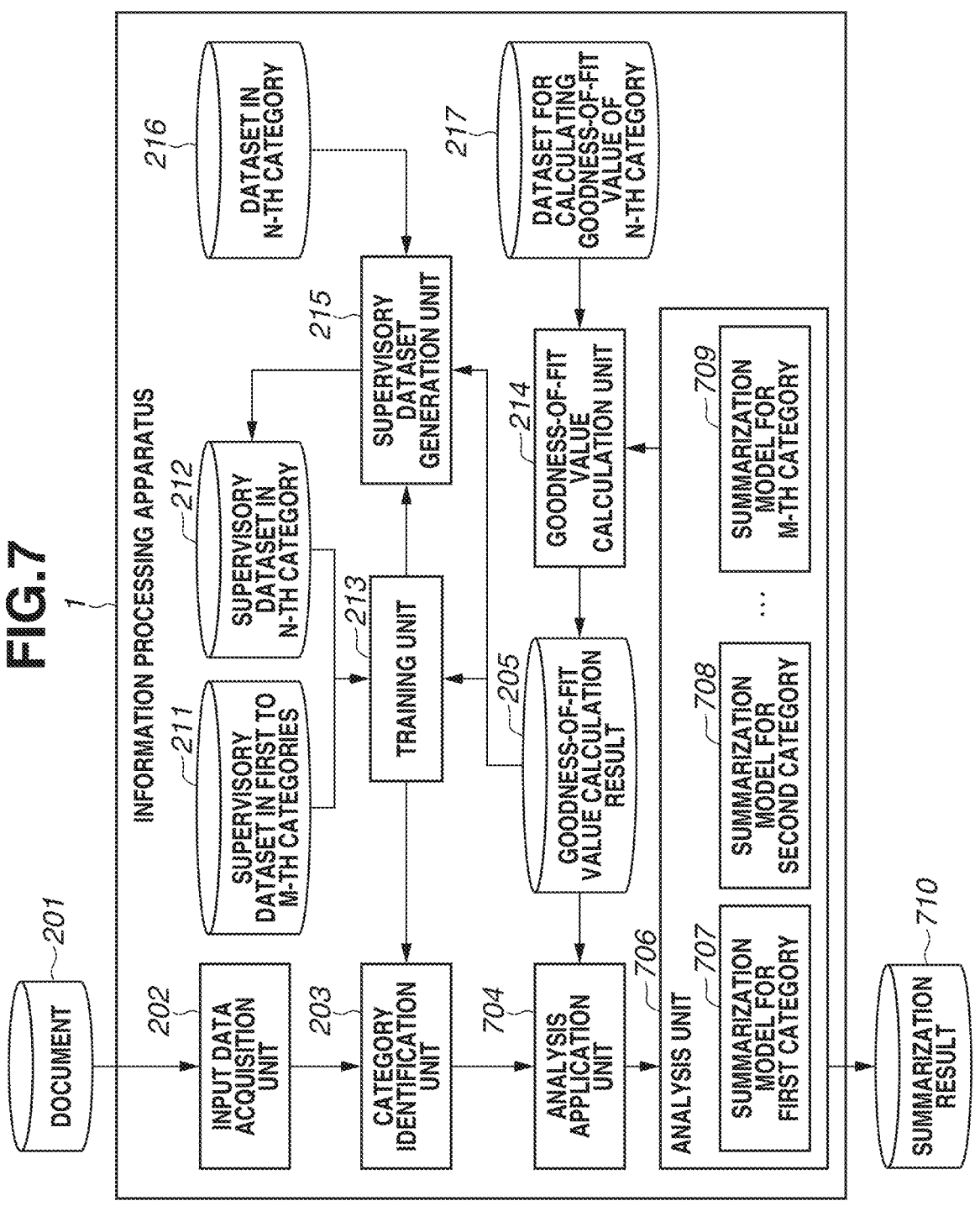
FIG. 7 is a diagram illustrating a functional configuration example of an information processing apparatus.

FIG. 7 is a diagram illustrating a functional configuration example of an information processing apparatus according to the present exemplary embodiment. The functional configuration in FIG. 7 is different from the functional configuration in FIG. 2 in that the input data acquisition unit 202 acquires a document 701 as input data and an analysis unit 706 has a summarization model dedicated to each category. Additionally, the functional configuration in FIG. 7 is different from the functional configuration in FIG. 2 in that an analysis application unit 704 selects the summarization model and a summarization result 710 is output as a result of application of the summarization model. In the present exemplary embodiment, the analysis unit 706 includes M summarization models for respective M categories (a summarization model 707 for the first category, a summarization model 708 for the second category, . . . , a summarization model 709 for the M-th category). Meanwhile, the analysis unit 706 does not include a summarization model for the N-th category (N>M).

The category identification unit 203 identifies a category of the document. A category identification model included in the category identification unit 203 is, for example, a machine learning model that has been fine-tuned by a known training method for category identification based on a model according to Non-Patent Literature.

Each summarization model included in the analysis unit 706 is a machine learning model that has been fine-tuned by a known training method for the abstractive summarization based on a model of "BERT: Pre-training of Deep Bidirectional Transformers for Language Understanding", arXiv: 1810.04805, written by Jacob Devlin, Ming-Wei Chang, Kenton Lee, and Kristina Toutanova.

As the goodness-of-fit value A (N:m), for example, a score of Recall-Oriented Understudy for Gisting Evaluation (ROUGE), which is a type of an evaluation index for document summarization, is used. There are some variations of ROUGE. For example, in a case of ROUGE-L, a document summarized with a summarization model and a summarized model indicated by ground truth information regarding the input document are compared with each other, and a score calculated based on maximum sequences (the number of words) matched between the two documents is used. Assume that the higher the score of ROUGE, the higher the goodness-of-fit value.

In the present exemplary embodiment, a description will be given of a case where, among M goodness-of-fit values A (N:m), a goodness-of-fit value A (N:1) of the N-th category with respect to the summarization model 707 for the first category and a goodness-of-fit value A (N:2) of the N-th category with respect to the summarization model 708 for the second category are a threshold or more. In this case, it is possible to apply both the summarization model 707 for the first category and the summarization model 708 for the second category to the document in the N-th category. In contrast, assume that goodness-of-fit values A ((N:3) to (N:M)) of the N-th category data with respect to summarization models for the third to M-th categories are less than the threshold, and none of the summarization models for the third to M-th categories is applicable to the document in the N-th category.

Processing executed by the supervisory dataset generation unit 215 in the present exemplary embodiment is described below.

Figure 8:
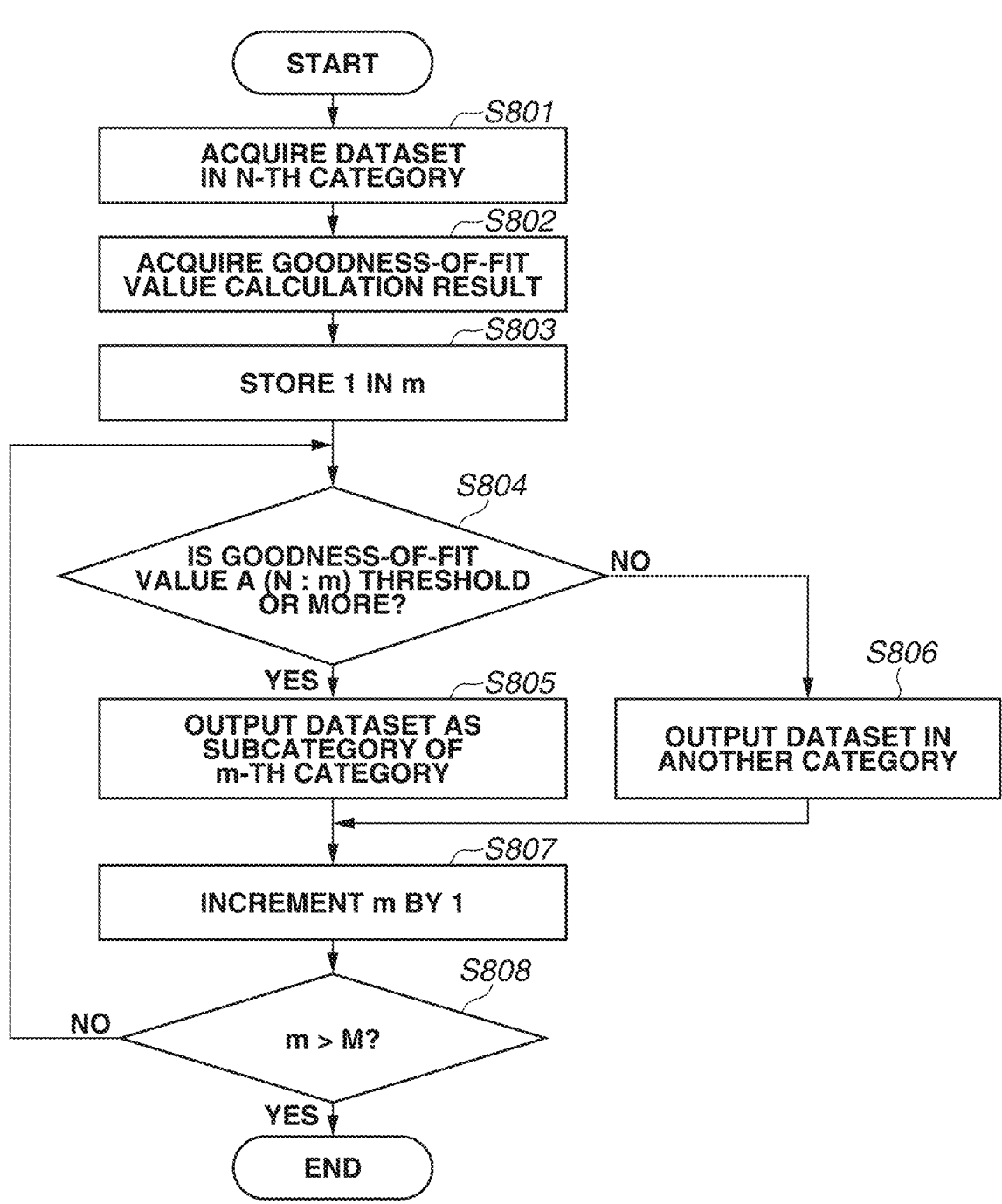
FIG. 8 is a flowchart describing processing of generating supervisory data in the N-th category.

FIG. 8 is a flowchart describing processing of generating supervisory data in the N-th category.

In S801, the supervisory dataset generation unit 215 acquires the dataset 216 in the N-th category.

In S802, the supervisory dataset generation unit 215 acquires the goodness-of-fit value A (N:m) (m=1, 2, . . . , M) of data in the N-th category with respect to each of the summarization models for the first to M-th categories from the goodness-of-fit value calculation result 205.

In S803, the supervisory dataset generation unit 215 stores 1 in m indicating a category number.

In S804, the supervisory dataset generation unit 215 determines whether the goodness-of-fit value A (N:m) is a predetermined threshold or more. In a case where the supervisory dataset generation unit 215 determines that the goodness-of-fit value A (N:m) is the threshold or more (YES in S804), the processing proceeds to S805. In a case where the supervisory dataset generation unit 215 determines that the goodness-of-fit value A (N:m) is less than the threshold (NO in S804), the processing proceeds to S806.

In S805, the supervisory dataset generation unit 215 labels the dataset 216 in the N-th category with a subcategory of the m-th category, and generates a dataset as the supervisory dataset 212 in the N-th category. The generated supervisory dataset 212 is stored in the secondary storage device 14 or the like. Thereafter, the processing proceeds to S807.

In S806, the supervisory dataset generation unit 215 labels the dataset 216 in the N-th category with a category different from the m-th category and generates a dataset as the supervisory dataset 212 in the N-th category. The generated supervisory dataset 212 is stored in the secondary storage device 14 or the like. Thereafter, the processing proceeds to S807.

In S807, the supervisory dataset generation unit 215 increments m indicating the category number by 1, and the processing proceeds to S808.

In S808, the supervisory dataset generation unit 215 determines whether a relation of m>M holds. In a case where a relation of m≤M holds (NO in S808), the processing proceeds to S804. In a case where the relation of m>M holds (YES in S808), a series of processing in the flowchart ends. In the present exemplary embodiment, the data in the N-th category is handled as supervisory data in a subcategory of the first category and a subcategory of the second category.

In the present exemplary embodiment, the N-th category is handled as the subcategory of the first category and the subcategory of the second category. However, in a case where there are two or more summarization models having goodness-of-fit values A (N:m) that are the threshold or more, the category of any of the summarization models may be selected as a subcategory. For example, the categories of n summarization models having goodness-of-fit values A (N:m) that are ranked from the top to the n-th may be selected as subcategories. In this case, in a case where n is 1, the category of a summarization model with the highest goodness-of-fit value serves as a subcategory.

Subsequently, training processing on the category identification model according to the present exemplary embodiment is described with reference to FIG. 5. A difference from the first exemplary embodiment is now described.

In S506, the training unit 213 handles the N-th category as the subcategory of the first category and the subcategory of the second category. Hence, in S507, even though the training unit 213 identifies a category of the data in the N-th category as the first category or the second category in step S505, the training unit 213 calculates the loss value by handling it as a ground truth. On the other hand, in a case of identifying the category of the data in the N-th category as any of the third to M-th categories, an error at the time of application of summarization is permissible, and the training unit 213 calculates the loss value to be a higher value to prevent erroneous identification. For example, the training unit 213 may multiply the calculated loss value with a correction coefficient of 1 or more, or correct the loss value according to the goodness-of-fit value so that the loss value becomes higher as the goodness-of-fit value becomes lower.

In the present exemplary embodiment, the category identification unit 203 uses the category identification model obtained by being trained in this manner to identify the category of the input document 701. In a case where the category of the document 701 is identified as the first category or a first subcategory, the analysis application unit 704 performs control to apply the summarization model 707 for the first category to the input document 701. In a case where the category of the document 701 is identified as the second category or a second subcategory, the analysis application unit 704 performs control to apply the summarization model 708 for the second category to the input document 701.

In the present exemplary embodiment, in a case where only the summarization model in the specific category exits and a document in a category other than the specific category is acquired, the summarization model in the specific category corresponding to the goodness-of-fit value is selected, whereby a high-quality summarization task becomes possible. Additionally, by utilizing a document in a category other than the specific category for training on the category identification model as supervisory data for identifying a document in the specific category with a high goodness-of-fit value with respect to the category, it becomes easier to identify an appropriate category to which the summarization task is applied. That is, by effectively utilizing the known analysis model, it becomes possible to perform an analysis task with high accuracy also with respect to input data in a category other than the specific category.

As described above, in a case where only the analysis model in the specific category exists, it is possible to perform highly accurate analysis with respect to a category other than the specific category without newly performing training on an analysis model in a category other than the specific category. With this configuration, it is possible to increase a type of a category applicable to the analysis model.

Modification of Second Embodiment

The training unit 213 according to the present exemplary embodiment trains the category identification model with the N-th category as the subcategory of the first category and the subcategory of the second category. Meanwhile, in the category identification model that has been trained in this manner, there is a case where identification performance of the first category or the second category decreases. In such a case, the supervisory dataset generation unit 215 does not label the supervisory data in the N-th category with a subcategory, but adds a category and labels the supervisory data in the N-th category with the N-th category itself. The training unit 213 performs training using the supervisory dataset 212 in the N-th category that has been generated in this manner. The analysis application unit 704 applies a summarization model for a category with the highest goodness-of-fit value of the N-th category (the summarization model for the first category or the second category) to the document 701 identified as being in the N-th category using the category identification model, and performs summarization of the document 701 in the N-th category.

Other Exemplary Embodiments

While the present disclosure has described exemplary embodiments, the above-mentioned exemplary embodiments are merely concrete examples of implementing the present disclosure, and the technical scope of the present disclosure should not be interpreted in a limited manner by the exemplary embodiments. That is, the present disclosure can be implemented in various modes without departing from the technical idea or the principal features of the present disclosure.

Embodiments of the present disclosure can be implemented by supplying computer-executable instructions (e.g., a program) that implements one or more functions of the exemplary embodiments described above to a system or an apparatus through a network or a storage medium, and one or more processors in a computer of the system or the apparatus loading and executing the program. Furthermore, embodiments of the present disclosure can be implemented by a circuit (e.g., an ASIC) that implements one or more functions.

The disclosure of each exemplary embodiment described above includes the following configuration, method, and program.

According to the present disclosure, it is possible to perform analysis on data for each category with high accuracy.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-132122, which was filed on Aug. 14, 2023 and which is hereby incorporated by reference herein in its entirety.

What is claimed is:

1. An information processing apparatus comprising:
one or more memories storing instructions; and
one or more processors that are in communication with the one or more memories and that, when executing the instructions, cooperate with the one or more memories to perform operations that comprise:
training an identification model configured to identify a category of an object in image data, among an identification model configured to identify a category of an object in image data and a detection model for the category configured to detect a specific part of the object after the category has been identified by the identification model;
calculating a goodness-of-fit value, based on a difference between (i) a region of the specific part of an object in a first category detected by inputting image data including the specific part of the object in the first category to a detection model configured to detect a specific part of an object in a second category, and (ii) ground truth information indicating a region in the image data where the specific part of the object in the first category is present, wherein the information processing apparatus does not include a detection model configured to detect the specific part of an object in the first category; and
wherein, in a case where the goodness-of-fit value is equal to or greater than a threshold, training the identification model using supervisory data obtained by labeling the image data including the specific part of the object in the first category with a label of an object in the second category.

2. The information processing apparatus according to claim 1, wherein the operations further comprise identifying a category of an image.

3. The information processing apparatus according to claim 1, wherein the operations further comprise identifying a category of a document.

4. The information processing apparatus according to claim 1, wherein the second category is a category of an analysis model.

5. The information processing apparatus according to claim 4, wherein, in a case where identification performance of the identification model with respect to data belonging to the second category decreases as a result of the training, the training of the identification model uses supervisory data labeling data belonging to the first category with the first category to train the identification model.

6. The information processing apparatus according to claim 1, wherein the first category is different from a category of an analysis model.

7. The information processing apparatus according to claim 1, wherein the identification model is a neural network.

8. An information processing apparatus comprising:
one or more memories storing instructions; and
one or more processors that are in communication with the one or more memories and that, when executing the instructions, cooperate with the one or more memories to perform operations that comprise:

identifying, using an identification model configured to identify a category of an object in image data, a category of input image data; and
performing control to apply, to the input image data, a detection model configured to detect a specific part of an object in the category identified by the identifying, wherein the identification model has been trained using supervisory data obtained by labeling image data including a specific part of an object in a first category with a label of an object in a second category in a case where a goodness-of-fit value, which is based on a difference between (i) a region of the specific part detected by inputting the image data including the specific part of the object in the first category to a detection model configured to detect the specific part of an object in the second category and (ii) ground truth information indicating a region in the image data where the specific part of the object in the first category is present, is equal to or greater than a threshold.

9. An information processing method comprising:
training an identification model configured to identify a category of an object in image data, among an identification model configured to identify a category of an object in image data and a detection model for the category configured to detect a specific part of the object after the category has been identified by the identification model;
calculating a goodness-of-fit value, based on a difference between (i) a region of the specific part of an object in a first category detected by inputting image data including the specific part of the object in the first category to a detection model configured to detect a specific part of an object in a second category, and (ii) ground truth information indicating a region in the image data where the specific part of the object in the first category is present, wherein the information processing apparatus does not include a detection model configured to detect the specific part of an object in the first category; and
wherein, in a case where the goodness-of-fit value is equal to or greater than a threshold, training the identification model using supervisory data obtained by labeling the image data including the specific part of the object in the first category with a label of an object in the second category.

10. A non-transitory computer-readable medium storing computer-executable instructions for causing a computer to perform the method according to claim 9.

11. An information processing method comprising:
identifying, using an identification model configured to identify a category of an object in image data, a category of input image data; and
performing control to apply, to the input image data, a detection model configured to detect a specific part of an object in the category identified by the identifying, wherein the identification model has been trained using supervisory data obtained by labeling image data including a specific part of an object in a first category with a label of an object in a second category in a case where a goodness-of-fit value, which is based on a difference between (i) a region of the specific part detected by inputting the image data including the specific part of the object in the first category to a detection model configured to detect the specific part of an object in the second category and (ii) ground truth information indicating a region in the image data where the specific part of the object in the first category is present, is equal to or greater than a threshold.

12. A non-transitory computer-readable medium storing computer-executable instructions for causing a computer to perform the method according to claim 11.

* * * * *